C. W. ABBOTT.
METAL CONDUIT FOR ELECTRIC WIRES.
APPLICATION FILED AUG. 18, 1915.
1,291,699.
Patented Jan. 21, 1919.
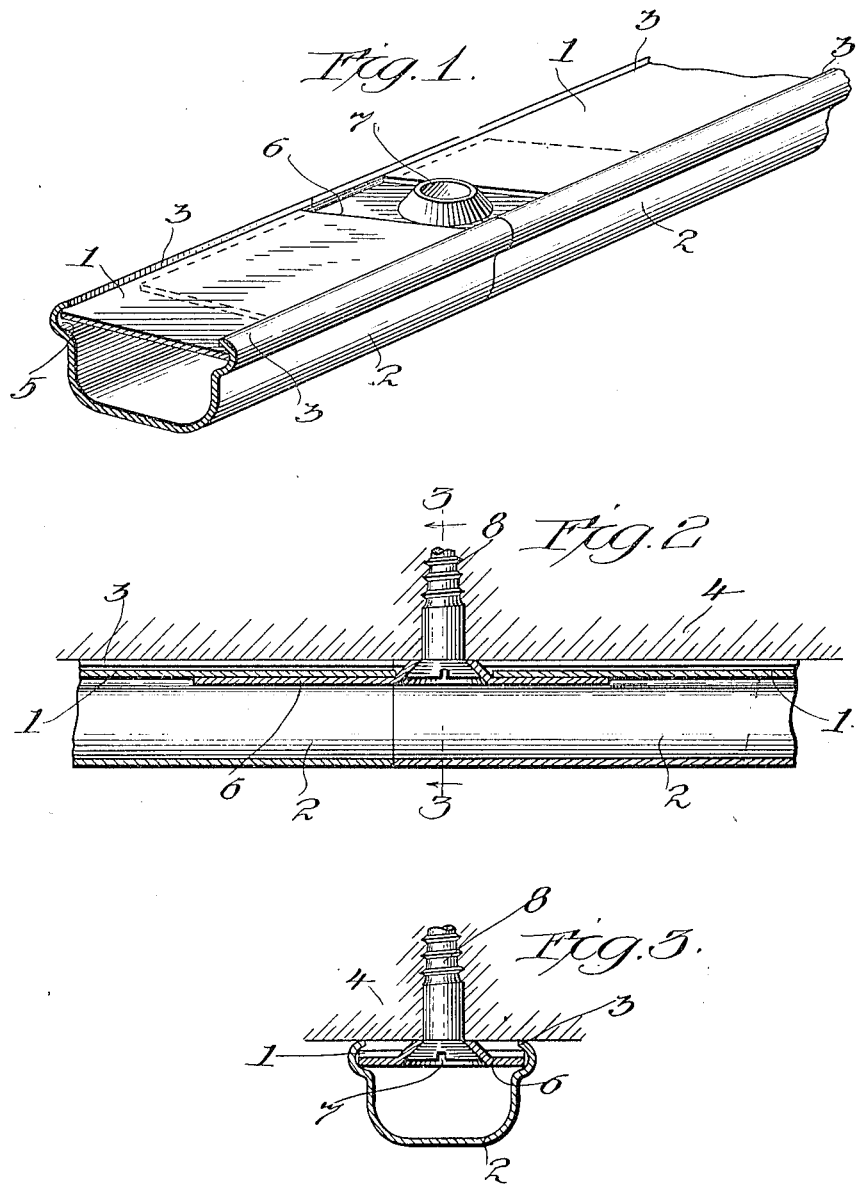

UNITED STATES PATENT OFFICE.

CHAUNCEY W. ABBOTT, OF PITTSBURGH, PENNSYLVANIA, ASSIGNOR TO AMERICAN CONDUIT MANUFACTURING COMPANY, OF PITTSBURGH, PENNSYLVANIA, A CORPORATION OF PENNSYLVANIA.

METAL CONDUIT FOR ELECTRIC WIRES.

1,291,699.  Specification of Letters Patent.  Patented Jan. 21, 1919.

Application filed August 18, 1915. Serial No. 46,066.

*To all whom it may concern:*

Be it known that I, CHAUNCEY W. ABBOTT, a citizen of the United States, residing at Pittsburgh, in the county of Allegheny and State of Pennsylvania, have invented a certain new and useful Improvement in Metal Conduits for Electric Wires, of which the following is a full, clear, concise, and exact description, reference being had to the accompanying drawings, forming a part of this specification.

My invention relates to metal conduits for electric wires and particularly to conduits for application to a wall, ceiling or other exposed supporting surface, such as are used for installing electric wiring systems after erection of the building, or for extending existing systems or for other purposes.

The object of my present invention is to provide a conduit of this class which is of simple and inexpensive construction, which has a neat and graceful appearance when applied to a wall or other supporting surface, which can be easily and readily assembled and applied to its associated supporting surface, and one which provides perfect electric continuity of the conduit so that it may be used as the return or ground conductor of the electrical system. In attaining the objects of my invention I have produced a conduit which when attached to a flat supporting surface seals the space between the supporting surface and the conduit itself by means of a pair of sharp, almost knife-like edges which press against and slightly into the supporting surface and prevent the collection of either dust or moisture in the space between the conduit and the supporting wall or ceiling.

The principal object of metal conduits is to confine break-downs of the electric system to quarters in which they cannot communicate fire to the building in which the break-downs occur. Even with great precaution the conduit occasionally becomes heated through some wiring break-down within, which is responsible for the precaution against dust, as provided in my improved conduit.

In the hereindescribed embodiment of my invention the supporting means for the conduit is hidden from view and the conduit presents a continuous, unbroken and artistic external visible surface.

In the accompanying drawings illustrating my invention—

Figure 1 is a perspective view showing the adjacent ends of two conduit sections and the means for coupling the said sections together;

Fig. 2 is a longitudinal sectional view; and

Fig. 3 is a cross-sectional view taken on the line 3—3 of Fig. 1 looking in the direction indicated by the arrows.

Similar characters or reference refer to similar parts throughout the several views.

Each of the conduit sections comprises two principal elements: that is, a base 1 and a cap or cover 2. The bases 1 are preferably flat, imperforate, metal strips, each of the said bases 1 being made of any suitable materal, such as, for instance, galvanized steel, and being of uniform width from end to end with well defined lateral edges so as to produce good electrical contact with its associated cover member. Each of the cover members 2 is also made of suitable material, such as thin sheet steel of such weight and thickness as to be fairly rigid and strong, thus avoiding the accidental production of bends or twists in handling the material which might produce a permanent distortion or set thereof. In cross-section the cap or cover is in general of U-shape, each edge of the material being bent or pressed to form inwardly extending projections 3 which lie between the base and the wall or other supporting surface at 4 when the conduit is attached thereto. The projections 3 in the present embodiment of my invention are desirably in the form of continuous flanges as shown. As is most clearly illustrated in Figs. 1 and 3, the projections 3 on the two sides of the cover form the edges of inwardly facing channels 5 which are substantially semi-cylindrical in cross-section. The base members 1 and their associated cap or cover members 2 are assembled as is illustrated in the drawings, it being understood that the covers 2 are of such size that the distance between the side walls of each one of the covers between the bottoms of its grooves 5 is slightly less than the width of the associated base member, in order that when the parts are assembled, as shown in Fig. 1, the base member will be rigidly clamped between the arms of its associated U-shaped cover or cap member. Each of the base members 1 is frictionally held between the U-shaped arms of its cover or cap member 2, the sharp edges of the base producing good electrical contact along the cap and base.

For securing adjacent or successive conduit sections to each other, a special coupling or bond is employed, which in the hereindescribed embodiment of my invention lies in a plane in immediate proximity to and parallel to the plane of the base members of the connected conduit sections. When two conduit sections are to be connected, the adjacent ends of the base members of the sections to be connected are cut so that they fall short of coming to the ends of their associated cover members 2. The coupling member 6 is then inserted into the channels 5—5 of each of the cover members 2, and the adjacent ends of the cover members are brought into engagement as is illustrated in Fig. 1, the coupling member 6 overlapping the joint between the cover members 2 and lying against the inner face of the base members 1 of the connected conduit sections. It will be seen that the coupling member 6 may be and desirably is of substantially the same material as the base members 1.

The coupling member 6 is desirably provided with an aperture 7 through which a suitable fastening device, such as the fillet-head screw 8 may be passed to secure the conduit sections to a wall or other supporting surface. It will be seen that the screwhead does not project beyond the inner face of the coupling member 6 and thus does not obstruct the channel through the conduit sections. The coupling is entirely concealed by the associated cap or cover members 2—2 which rest solidly against the supporting surface so that there are no unsightly projections and the conduit has a neat and graceful appearance.

What I claim as new and desire to secure by Letters Patent of the United States is:

1. A conduit of the class described comprising in combination with a pair of channel shaped cover members disposed end to end, each cover member provided with seats at its edges, a substantially flat base member associated with each cover member and disposed in the seats thereof and a flat one-piece coupling member disposed in the seats of said cover members and lying against the inner faces of the base members associated with said cover members, said coupling member overlapping said cover members and base members and affording a mechanical and electrical bond between them.

2. A conduit of the class described comprising in combination with a pair of channel shaped cover members disposed end to end, each cover member provided with seats at its edges, a substantially flat base member associated with each cover member and disposed in the seats thereof, a flat one-piece coupling member disposed in the seats of said cover members and lying against the inner faces of the base members associated with said cover members, said coupling member overlapping said cover members and base members and affording a mechanical and electrical bond between them, the adjacent ends of the flat base members being disposed with a substantial space between them and an aperture in said coupling member at a point intermediate the ends of said base members for receiving a fastening device to secure the conduit to a supporting surface with the edges of the channel cover members engaging the supporting surface.

In witness whereof, I hereunto subscribe my name this 13th day of August, A. D. 1915.

CHAUNCEY W. ABBOTT.

Witnesses:
W. H. STONE,
G. M. STEUART.